Aug. 1, 1939.  H. J. CRINER  2,167,939

SLICING MACHINE

Filed May 23, 1938

INVENTOR.
Harry J. Criner
BY Bush & Bush
ATTORNEYS.

Patented Aug. 1, 1939

2,167,939

UNITED STATES PATENT OFFICE 2,167,939

SLICING MACHINE

Harry J. Criner, Davenport, Iowa, assignor of one-half to A. G. Bush, Davenport, Iowa Application May 23, 1938, Serial No. 209,495

20 Claims. (Cl. 146—88)

My invention relates to band-blade slicing machines.

The objects of my invention are to provide a simple form of multiple-bladed machines in which alternating blades run in opposite directions and which will permit the cutting courses of the blades to be arranged in parallel with their transverse axes at right angles to the line of travel of the bread; to provide a form of band-blade machine in which no twisting of the blades is necessary; to provide a form of band-blade machine which will permit the slicing of an entire loaf while traveling through a relatively short distance; to provide a multiple-band-blade machine in which friction between the blades and blade guides may be substantially reduced or practically eliminated.

I attain these objects by the means illustrated in the accompanying drawing, in which.

Similar numerals refer to similar parts throughout the several views.

Figures 1, 2, 3, 4, 5:
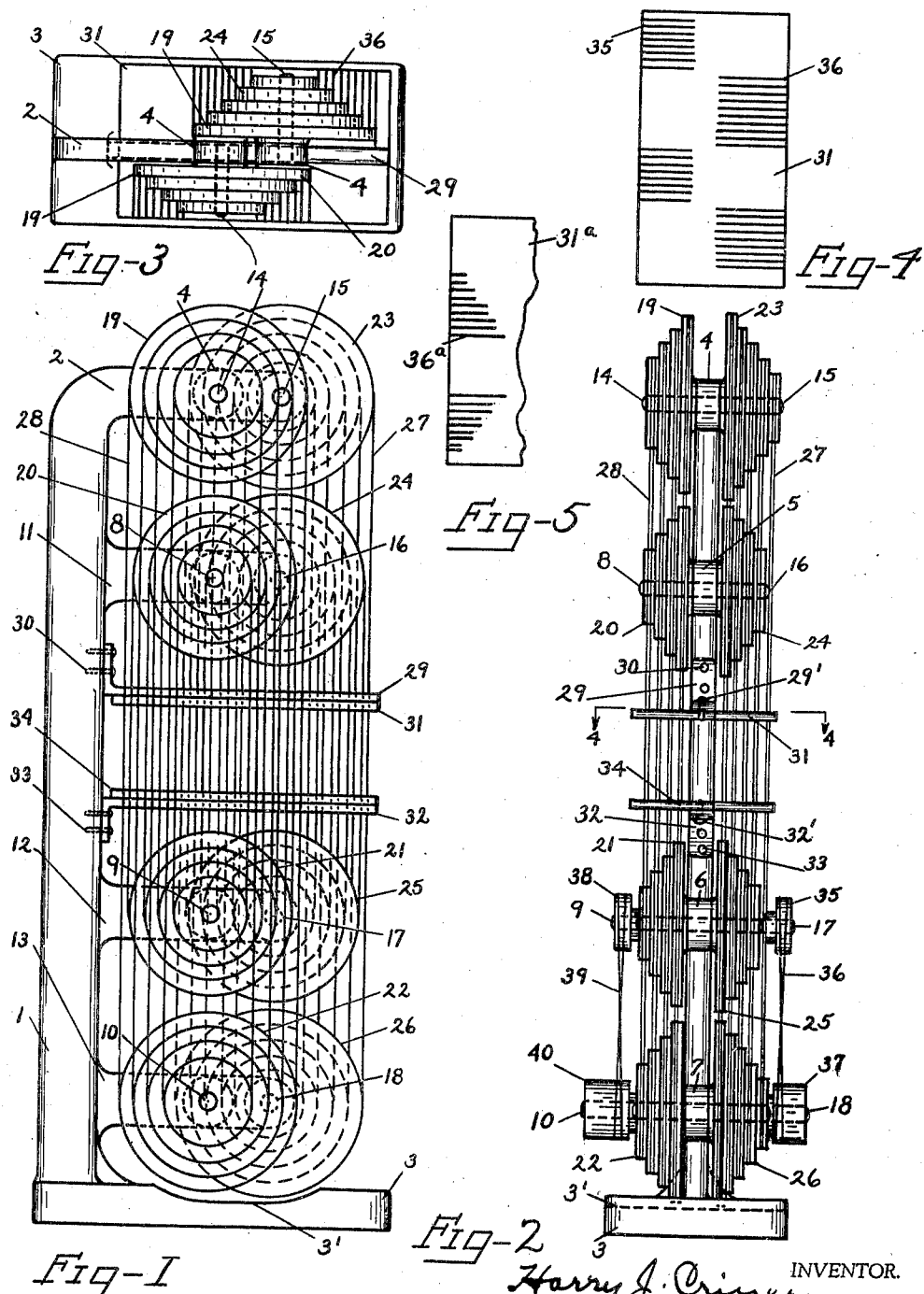
Figure 1 is a front elevation of my machine.
Figure 2 is a side elevation.
Figure 3 is a top or plan view.
Figure 4 is a detail of the bread supporting table or retaining plate.
Figure 5 is a detail of an optional slotted discharge table.

My apparatus comprises a frame 1 with an extended foot or base 3 with arms 2, 11, 12 and 13 united to the frame 1 and extending transversely of the machine at right angles to the frame 1.

The frame may be columnar or T-shaped in section or any other suitable form and may comprise a single column 1 or any other suitable form of supporting frame. I prefer to use a frame with a single column as shown in Figure 1 because it renders the parts mounted thereon more easily accessible.

In each of the arms 2, 11, 12 and 13 I mount shafts 8, 9, 10, 14, 15, 16, 17 and 18, each arm having one shaft extending to the front, as at 14, and one to the rear, as at 15.

For convenience I refer to the shafts 8, 9, 16 and 17 as the inner shafts and to the pulleys mounted thereon as the inner pulleys. I refer to the remaining shafts and pulleys as the outer shafts and pulleys.

Upon the inner shafts I mount stepped-cone pulleys 20, 21, 24 and 25. The pulleys are arranged in properly spaced front and rear pairs and similar cone pulleys are similarly mounted upon the outer shafts.

A description of one of the cone pulleys will apply to all of the cone pulleys, except for the variations in size, the outer pulleys being slightly larger than the inner pulleys so that each step of the outer pulleys has a radius as much longer than the corresponding step of the corresponding inner pulleys as the thickness of one of the slices of bread designed to be cut by the machine, and the radii of the successive steps of any cone pulley will exceed the radii of the next smaller steps by twice the thickness of such a slice of bread.

The front shafts are mounted in parallel with their axes extending longitudinally of the machine in a single plane and the rear shafts are similarly mounted, but extend longitudinally toward the rear of the machine.

With a machine so formed, it is obvious that the blades will travel vertically in parallel lines through their cutting courses and very little guidance will be required as the blades are not twisted at any point in their travel.

It is necessary to provide means for supporting the bread and for holding the bread against upward displacement. It is advisable also to provide means close to the bread to prevent any lateral whipping or vibration of the blades. I therefore provide arms 29 and 32 which may be secured to the frame by set screws 30 and 33 or any other suitable means, which arms extend transversely of the machine and upon the arms 32 I mount a supporting table 34 to support the bread during the slicing operation.

Upon the upper arm 29 I mount a plate 31 similar to the table. The plate 31 and table 34 are provided with a plurality of slots 35 and 36 extending inwardly from their front and rear edges, through which the blades travel. The slots in the plate 31 and table 34 are preferably made very narrow, being merely enough wider than the thickness of the blades to permit the blades to travel freely therethrough.

The plate 31 and table 34 may be made of sheet metal, Bakelite or any other suitable material and may be composed of material adapted to act as wipers for the blades so as to clean the blades of any gummy or other accumulation produced thereon by slicing bread while it is warm.

The shafts 14, 15, etc., may have their inner ends threaded into the respective arms in which they are mounted or they may be secured thereto by any suitable means. I prefer to mount the upper pulleys of each pair upon adjustable shafts as shown in my co-pending application Serial Number 208,129, dated May 16, 1938, so as to provide means for adjusting the tension of the blades.

The cone pulleys 19, 23, etc., are preferably faced with resilient material which will take up a certain amount of slack.

In the drawing I have shown only two pairs of front and rear pulleys and that form will provide the simplest form of construction for my machine, but will produce considerable variation in the rate of travel of the various blades. Obviously the blades upon the steps having the greatest diameter will travel materially faster than the blades upon the smaller steps but this difficulty may be overcome to a degree by utilizing more pulleys. For instance, to double the number of front pulleys and the number of rear pulleys would permit reducing the number of steps upon each pulley, thereby reducing the variation in travel of the blades and when so formed, it is obvious that the distance the bread would have to travel during the slicing operation would be correspondingly reduced, because with only two blades upon the front pulleys and three blades upon the rear pulleys, the blades would occupy approximately half of the length required by the form shown in Figure 1.

It is obvious that the inner and outer pairs of pulleys may be so arranged that each pair will carry the same number of blades or the outer pair may be arranged to carry one more blade than the inner pair without interfering with the proper spacing of the blades during their slicing courses, and in the claims I have used the term "similar plurality" to indicate either a plurality having the same identical number of band-blades upon both the inner and outer pairs of pulleys or a plurality of band-blades upon one pair of pulleys having a number one greater than the plurality upon the other corresponding pair of pulleys in the same transverse plane.

The slots in the plate 31 and table 34 of course will be varied to correspond to the particular lines of travel of the blades in any given form of machine.

To the lower cone pulleys 22 and 26 I attach drive-wheels 40 and 37 which may be driven by any suitable prime-mover and to the cone pulleys 21 and 25 I attach drive-wheels or pulleys 38 and 35. The latter drive pulleys may be driven by crossed belts 39 and 36 connecting them with the drive pulleys 40 and 37.

Crossing of these belts will drive the inner cone pulleys in a direction opposite to the travel of the outer cone pulleys. Each blade through its cutting course will travel in a direction opposite to the travel of the next succeeding blades on each side thereof, thus stabilizing the bread against displacement during the slicing operations.

For ordinary purposes the tension of the blades upon the peripheries of the respective steps of the cone pulleys is intended to be sufficient to prevent displacement. In addition to this upon the front pulleys, the next succeeding step rearwardly will form a stop for the blades and a slight rim may be formed upon the rearmost step of the cone pulleys if desired, to prevent rearward displacement of the front blades.

A similar slight rim may be formed upon the rear of the peripheries of each step of the rear cone pulleys if desired, or any other suitable device may be utilized to prevent displacement of the rear blades.

Any suitable form of feed and discharge tables may be utilized with my apparatus, as such tables are in common use and wellknown.

In Figure 5 I have shown a fragmentary detail of a discharge table 31a having its front edge slotted to form guides 36a for the rear blades and these slots are formed with progressive depths so that the heel of each slot may act as a guide to prevent rearward displacement of the blades.

In the form of apparatus shown, it is obvious that only four cuts will be in progress at any one time in any given vertical plane extending lengthwise of the loaf of bread to be sliced, and this arrangement will tend to prevent any of the jamming or wedging of the bread between the blades which occurs when all of the blades are cutting simultaneously in a single vertical plane.

It will be noticed that while this form of apparatus produces some variation in the speed of the blades, all of the blades acting in a single vertical plane extending lengthwise of the loaf of bread being sliced, will be traveling at practically identical speed and that adjacent pairs of blades traveling in the same plane are always traveling in opposite directions and at substantially identical speeds, because the pulleys 35 and 38 will be made enough smaller than the pulleys 37 and 40 to allow for substantially overcoming the variation in the diameters of the steps of the inner pulleys with relation to the steps of the outer pulleys.

It is obvious that various modifications of my apparatus may be made without departing from the spirit of my invention and I do not limit my claims to the precise forms shown in the drawing.

I claim:

1. In a slicing machine of the class described, a frame, an inner and an outer pair of parallel spaced shafts mounted in line upon the frame and extending forwardly therefrom, an inner and an outer pair of parallel spaced shafts mounted in line upon the frame and extending rearwardly therefrom, stepped cone pulleys mounted upon the shafts, the peripheries of the respective steps upon the outer pulleys having radii exceeding the radii of the corresponding steps of the inner pulleys by the thickness of a slice of bread designed to be sliced thereby, band-blades mounted upon the corresponding peripheries of the steps of the inner pulleys respectively, band-blades mounted upon the corresponding peripheries of the steps of the outer pulleys respectively, and means for driving the pulleys.

2. In a slicing machine of the class described, a frame, an inner and an outer pair of parallel spaced shafts mounted in line upon the frame and extending forwardly therefrom, an inner and an outer pair of parallel spaced shafts mounted in line upon the frame and extending rearwardly therefrom, stepped cone pulleys mounted upon the shafts, the peripheries of the respective steps upon the outer pulleys having radii exceeding the radii of the corresponding steps of the inner pulleys by the thickness of a slice of bread designed to be sliced thereby, band-blades mounted upon the corresponding peripheries of the steps of the inner pulleys respectively, band-blades mounted upon the corresponding peripheries of the steps of the outer pulleys respectively, and means for driving the inner and outer pulleys in opposite directions.

3. In a slicing machine of the class described, a frame, an inner and an outer pair of parallel spaced shafts mounted in line upon the frame and extending forwardly therefrom, an inner and an outer pair of parallel spaced shafts mounted in line upon the frame and extending rearwardly therefrom, stepped cone pulleys mounted upon the shafts, the peripheries of the respective steps upon the outer pulleys having radii exceeding the radii of the corresponding steps of the inner pulleys, band-blades mounted upon the corresponding peripheries of the steps of the inner pulleys respectively, band-blades mounted upon the corresponding peripheries of the steps of the outer pulleys respectively, and means for driving the inner and outer pulleys in opposite directions at substantially uniform speeds, in combination with means to support and retain the bread against displacement during the cutting process.

4. In a slicing machine of the class described, a frame, an inner and an outer pair of parallel spaced shafts mounted in line upon the frame and extending forwardly therefrom, an inner and an outer pair of parallel spaced shafts mounted in line upon the frame and extending rearwardly therefrom, stepped cone pulleys mounted upon the shafts, band-blades mounted upon the corresponding peripheries of the steps of the inner pulleys respectively, band-blades mounted upon the corresponding peripheries of the steps of the outer pulleys respectively, and means for driving the inner and outer pulleys in opposite directions at similar speeds, in combination with means for guiding and stabilizing the blades against lateral vibration while traveling through the cutting courses of the blades.

5. In a slicing machine of the class described, a frame, an inner and an outer pair of parallel spaced shafts mounted in line upon the frame and extending forwardly therefrom, an inner and outer pair of parallel spaced shafts mounted in line upon the frame and extending rearwardly therefrom, stepped cone pulleys mounted upon the shafts, band-blades mounted upon the corresponding peripheries of the steps of the inner pulleys respectively, band-blades mounted upon the corresponding peripheries of the steps of the outer pulleys respectively, and means for driving the pulleys.

6. A slicing machine of the endless band-blade type, comprising a frame, inner and outer parallel pairs of parallel spaced shafts mounted in line upon the frame, a stepped cone pulley revolvably mounted upon each of the inner pair of shafts respectively, a similar but slightly larger stepped cone pulley revolvably mounted upon each shaft of the outer pair of shafts respectively, the steps of the outer cone pulleys being of uniformly greater diameter than the steps of the inner pulleys, a plurality of band-blades mounted upon the inner pair of pulleys and a similar plurality of band-blades mounted upon the outer pair of cone pulleys, each of said band-blades having two parallel cutting courses running in the space intermediate the inner pulleys, and all the slicing planes of all of the blades being parallel to each other, said cone pulleys being so arranged that the steps of the inner pulleys lie in common planes with the corresponding steps of the outer pulleys so that the blade mounted upon any given steps of the two inner pulleys will travel with its cutting edge running in the same plane as the cutting edge of the blade mounted upon the corresponding steps of the outer pulleys and the cutting edges of both of said blades will travel in parallel straight lines in the same plane through the slicing courses thereof.

7. A slicing machine as described in claim 6, in combination with means for driving the inner and outer pairs of cone pulleys in opposite directions.

8. A structure as defined in claim 6, and means for driving the inner and outer pairs of cone pulleys in opposite directions simultaneously at the same speed.

9. In a slicing machine of the class described, a frame, inner and outer parallel pairs of parallel spaced shafts mounted in line upon the frame and extending forwardly therefrom, a pair of matched stepped cone pulleys revolvably mounted upon the inner shafts, a pair of matched stepped cone pulleys revolvably mounted upon the outer shafts with the steps of the outer pulleys corresponding to and running in the same planes as the respective corresponding steps of the inner pulleys, but with the peripheries of the respective steps upon the outer pulleys having radii exceeding the length of the radii of the corresponding steps of the inner pulleys by the length of the corresponding steps of the inner pulleys, band-blades mounted upon the peripheries of the corresponding steps of the inner pulleys respectively, band-blades mounted upon the peripheries of the corresponding steps of the outer pulleys respectively, and means for driving the inner and outer pulleys in opposite directions.

10. A structure as defined in claim 9, in combination with spaced guides intermediate the pulleys to guide and stabilize the blades against vibration in their cutting courses.

11. A bread slicing machine as described in claim 9, in combination with means for supporting the bread and retaining it against displacement while being sliced.

12. A structure as defined in claim 9, and means for driving the inner and outer pairs of pulleys in opposite directions at similar speeds.

13. A structure as defined in claim 9, means for driving the inner and outer pairs of pulleys in opposite directions at similar speeds, and means for supporting and retaining the bread against displacement while being sliced.

14. A bread slicing machine as described in claim 9, with spaced guides intermediate the pulleys of each pair to guide and stabilize the blades in their cutting courses.

15. A slicing machine as described in claim 9, and a slotted table to support the bread and guide the blades while the bread is being sliced.

16. A slicing machine as described in claim 9, a slotted table to support the bread and guide the blades while the bread is being sliced, and a pair of slotted plates arranged above and below the course of travel of the bread to support and retain the bread against displacement during the slicing operation.

17. A bread slicing machine as described in claim 5, the stepped cone pulleys being so arranged that each of the blades will have two cutting courses lying intermediate the pulleys carrying same and all of the cutting courses of all the blades being uniformly spaced transversely of the machine.

18. A bread slicing machine as described in claim 1, the stepped cone pulleys being so arranged that each of the blades will have two cutting courses lying intermediate the pulleys carrying same and all of the cutting courses of all the blades being uniformly spaced transversely of the machine.

19. A bread slicing machine as described in claim 5, the stepped cone pulleys being so arranged that each of the blades will have two cutting courses lying intermediate the pulleys carrying same and all of the cutting courses of all the blades being uniformly spaced transversely of the machine, the steps of the outer cone pulleys being of uniformly greater diameter than the corresponding steps of the inner pulleys, said cone pulleys being so arranged that the steps of the inner pulleys lie in comon planes with the corresponding steps of the outer pulleys so that the blade mounted upon any given steps of the two inner pulleys will travel with its cutting edge running in the same plane as the cutting edge of the blade mounted upon the corresponding steps of the outer pulleys and the cutting edges of both of said blades will travel in parallel straight lines in the same plane through the slicing courses thereof.

20. A slicing machine of the endless band-blade type comprising a frame, inner and outer parallel pairs of parallel spaced shafts mounted in line upon the frame, a stepped cone pulley revolvably mounted upon each of the inner pair of shafts respectively, a similar but slightly larger stepped cone pulley revolvably mounted upon each shaft of the outer pair of shafts respectively, the steps of the outer cone pulleys being of uniformly greater diameter than the steps of the inner pulleys, a plurality of band-blades mounted upon the inner pair of pulleys and a similar plurality of band-blades mounted upon the outer pair of cone pulleys, each of said band-blades having two parallel cutting courses running intermediate the inner pulleys, and all the slicing planes of all of the blades being parallel to each other, said cone pulleys being so arranged that the steps of the inner pulleys lie in common planes with corresponding steps of the outer pulleys so that the blade mounted upon any given steps of the two inner pulleys will travel with its cutting edge running in the same plane as the cutting edge of the blade mounted upon the corresponding steps of the outer pulleys and the cutting edges of both of said blades in their cutting courses will travel in parallel straight lines in the same plane.

HARRY J. CRINER.